(12) United States Patent
Grasegger et al.

(10) Patent No.: US 11,964,434 B2
(45) Date of Patent: Apr. 23, 2024

(54) CLOSURE DEVICE, 3D PRINTING DEVICE AND METHOD FOR PRODUCING 3D-MOLDED PARTS

(71) Applicant: Voxeljet AG, Friedberg (DE)

(72) Inventors: Josef Grasegger, Stadtbergen (DE); Bastian Heymel, Augsburg (DE); Wolfgang Mühlbauer, Augsburg (DE)

(73) Assignee: VOXELJET AG, Friedberg (DE)

( * ) Notice: Subject to any disclaimer, the term of this patent is extended or adjusted under 35 U.S.C. 154(b) by 0 days.

(21) Appl. No.: 17/267,580

(22) PCT Filed: Aug. 15, 2019

(86) PCT No.: PCT/DE2019/000222
§ 371 (c)(1),
(2) Date: Feb. 10, 2021

(87) PCT Pub. No.: WO2020/035100
PCT Pub. Date: Feb. 20, 2020

(65) Prior Publication Data
US 2021/0316507 A1 Oct. 14, 2021

(30) Foreign Application Priority Data
Aug. 16, 2018 (DE) .................. 10 2018 006 473.6

(51) Int. Cl.
*B29C 64/343* (2017.01)
*B29C 64/153* (2017.01)
(Continued)

(52) U.S. Cl.
CPC .......... *B29C 64/343* (2017.08); *B29C 64/153* (2017.08); *B29C 64/214* (2017.08);
(Continued)

(58) Field of Classification Search
None
See application file for complete search history.

(56) References Cited

U.S. PATENT DOCUMENTS

| 4,247,508 A | 1/1981 | Housholder |
| 4,575,330 A | 3/1986 | Hull |

(Continued)

FOREIGN PATENT DOCUMENTS

| AU | 720255 B2 | 5/2000 |
| CN | 101146666 A | 3/2008 |

(Continued)

OTHER PUBLICATIONS

US 4,937,420 A, 06/1990, Deckard (withdrawn)
(Continued)

*Primary Examiner* — James Sanders
(74) *Attorney, Agent, or Firm* — The Dobrusin Law Firm, P.C.

(57) ABSTRACT

Closure device suitable for a 3D printing device and/or coater device, comprising a closure means, wherein the closure means is activatable and can be opened by activating means, wherein the activating means is an eccentric, a draw key and/or a slotted link. The invention also relates to a method and a device for producing 3D mouldings, wherein such a closure device is used.

13 Claims, 7 Drawing Sheets

(51) Int. Cl.
*B29C 64/214* (2017.01)
*B29C 64/329* (2017.01)
*B33Y 10/00* (2015.01)
*B33Y 30/00* (2015.01)
*B33Y 40/00* (2020.01)

(52) U.S. Cl.
CPC ............. *B29C 64/329* (2017.08); *B33Y 10/00* (2014.12); *B33Y 30/00* (2014.12); *B33Y 40/00* (2014.12)

(56) References Cited

U.S. PATENT DOCUMENTS

| | | |
|---|---|---|
| 4,665,492 A | 5/1987 | Masters |
| 4,752,352 A | 6/1988 | Feygin |
| 4,752,498 A | 6/1988 | Fudim |
| 4,944,817 A | 7/1990 | Bourell et al. |
| 5,017,753 A | 5/1991 | Deckard |
| 5,031,120 A | 7/1991 | Pomerantz et al. |
| 5,047,182 A | 9/1991 | Sundback et al. |
| 5,059,266 A | 10/1991 | Yamane et al. |
| 5,120,476 A | 6/1992 | Scholz |
| 5,126,529 A | 6/1992 | Weiss et al. |
| 5,127,037 A | 6/1992 | Bynum |
| 5,134,569 A | 7/1992 | Masters |
| 5,136,515 A | 8/1992 | Helinski |
| 5,149,548 A | 9/1992 | Yamane et al. |
| 5,156,324 A | 10/1992 | Deckard et al. |
| 5,156,697 A | 10/1992 | Bourell et al. |
| 5,204,055 A | 4/1993 | Sachs et al. |
| 5,248,456 A | 8/1993 | Evans, Jr. et al. |
| 5,252,264 A | 10/1993 | Forderhase et al. |
| 5,284,695 A | 2/1994 | Barlow et al. |
| 5,342,919 A | 8/1994 | Dickens, Jr. et al. |
| 5,352,405 A | 10/1994 | Beaman et al. |
| 5,387,380 A | 2/1995 | Cima et al. |
| 5,398,193 A | 3/1995 | deAngelis |
| 5,503,785 A | 4/1996 | Crump et al. |
| 5,518,060 A | 5/1996 | Cleary et al. |
| 5,518,680 A | 5/1996 | Cima et al. |
| 5,555,176 A | 9/1996 | Menhennett et al. |
| 5,637,175 A | 6/1997 | Feygin et al. |
| 5,639,070 A | 6/1997 | Deckard |
| 5,639,402 A | 6/1997 | Barlow et al. |
| 5,647,931 A | 7/1997 | Retallick et al. |
| 5,658,412 A | 8/1997 | Retallick et al. |
| 5,665,401 A | 9/1997 | Serbin et al. |
| 5,717,599 A | 2/1998 | Menhennett et al. |
| 5,730,925 A | 3/1998 | Mattes et al. |
| 5,740,051 A | 4/1998 | Sanders, Jr. et al. |
| 5,749,041 A | 5/1998 | Lakshminarayan et al. |
| 5,753,274 A | 5/1998 | Wilkening et al. |
| 5,824,250 A | 10/1998 | Whalen |
| 5,851,465 A | 12/1998 | Bredt |
| 5,884,688 A | 3/1999 | Hinton et al. |
| 5,902,537 A | 5/1999 | Almquist et al. |
| 5,934,343 A | 8/1999 | Gaylo et al. |
| 5,940,674 A | 8/1999 | Sachs et al. |
| 5,943,235 A | 8/1999 | Earl et al. |
| 5,989,476 A | 11/1999 | Lockard et al. |
| 6,048,188 A | 4/2000 | Hull et al. |
| 6,048,954 A | 4/2000 | Barlow et al. |
| 6,146,567 A | 11/2000 | Sachs et al. |
| 6,147,138 A | 11/2000 | Hochsmann et al. |
| 6,155,331 A | 12/2000 | Langer et al. |
| 6,164,850 A | 12/2000 | Speakman |
| 6,165,406 A | 12/2000 | Jang et al. |
| 6,169,605 B1 | 1/2001 | Penn et al. |
| 6,193,922 B1 | 2/2001 | Ederer |
| 6,210,625 B1 | 4/2001 | Matsushita |
| 6,217,816 B1 | 4/2001 | Tang |
| 6,243,616 B1 | 6/2001 | Droscher et al. |
| 6,259,962 B1 | 7/2001 | Gothait |
| 6,270,335 B2 | 8/2001 | Leyden et al. |
| 6,305,769 B1 | 10/2001 | Thayer et al. |
| 6,335,097 B1 | 1/2002 | Otsuka et al. |
| 6,375,874 B1 | 4/2002 | Russell et al. |
| 6,403,002 B1 | 6/2002 | Van Der Geest |
| 6,405,095 B1 | 6/2002 | Jang et al. |
| 6,423,255 B1 | 7/2002 | Hoechsmann et al. |
| 6,500,378 B1 | 12/2002 | Smith |
| 6,554,600 B1 | 4/2003 | Hofmann et al. |
| 6,596,224 B1 | 7/2003 | Sachs et al. |
| 6,658,314 B1 | 12/2003 | Gothait |
| 6,672,343 B1 | 1/2004 | Perret et al. |
| 6,713,125 B1 | 3/2004 | Sherwood et al. |
| 6,722,872 B1 | 4/2004 | Swanson et al. |
| 6,733,528 B2 | 5/2004 | Abe et al. |
| 6,827,988 B2 | 12/2004 | Krause et al. |
| 6,830,643 B1 | 12/2004 | Hayes |
| 6,838,035 B1 | 1/2005 | Ederer et al. |
| 6,896,839 B2 | 5/2005 | Kubo et al. |
| 7,120,512 B2 | 10/2006 | Kramer et al. |
| 7,153,463 B2 | 12/2006 | Leuterer et al. |
| 7,291,002 B2 | 11/2007 | Russell et al. |
| 7,296,990 B2 | 11/2007 | Devos et al. |
| 7,332,537 B2 | 2/2008 | Bredt et al. |
| 7,348,075 B2 | 3/2008 | Farr et al. |
| 7,378,052 B2 | 5/2008 | Harryson |
| 7,455,805 B2 | 11/2008 | Oriakhi et al. |
| 7,497,977 B2 | 3/2009 | Nielsen et al. |
| 7,597,835 B2 | 10/2009 | Marsac |
| 7,641,461 B2 | 1/2010 | Khoshnevis |
| 7,790,096 B2 | 9/2010 | Merot et al. |
| 7,799,253 B2 | 9/2010 | Höschmann et al. |
| 8,186,415 B2 | 5/2012 | Marutani et al. |
| 8,574,485 B2 | 11/2013 | Kramer |
| 8,951,033 B2 | 2/2015 | Höchsmann et al. |
| 9,327,450 B2 | 5/2016 | Hein et al. |
| 10,046,520 B2 * | 8/2018 | Hermann ............... B65D 83/06 |
| 11,173,658 B2 * | 11/2021 | Paternoster ........... B29C 64/153 |
| 2001/0045678 A1 | 11/2001 | Kubo et al. |
| 2001/0050031 A1 | 12/2001 | Bredt et al. |
| 2002/0015783 A1 | 2/2002 | Harvey |
| 2002/0016387 A1 | 2/2002 | Shen |
| 2002/0026982 A1 | 3/2002 | Bredt et al. |
| 2002/0079601 A1 | 6/2002 | Russell et al. |
| 2002/0090410 A1 | 7/2002 | Tochimoto et al. |
| 2002/0111707 A1 | 8/2002 | Li et al. |
| 2002/0155254 A1 | 10/2002 | McQuate et al. |
| 2002/0167100 A1 | 11/2002 | Moszner et al. |
| 2003/0004599 A1 | 1/2003 | Herbak |
| 2003/0083771 A1 | 5/2003 | Schmidt |
| 2003/0114936 A1 | 6/2003 | Sherwood et al. |
| 2004/0003738 A1 | 1/2004 | Imiolek et al. |
| 2004/0012112 A1 | 1/2004 | Davidson et al. |
| 2004/0025905 A1 | 2/2004 | Ederer et al. |
| 2004/0026418 A1 | 2/2004 | Ederer et al. |
| 2004/0035542 A1 | 2/2004 | Ederer et al. |
| 2004/0036200 A1 | 2/2004 | Patel et al. |
| 2004/0038009 A1 | 2/2004 | Leyden et al. |
| 2004/0045941 A1 | 3/2004 | Herzog et al. |
| 2004/0056378 A1 | 3/2004 | Bredt et al. |
| 2004/0094058 A1 | 5/2004 | Kasperchik et al. |
| 2004/0112523 A1 | 6/2004 | Crom |
| 2004/0145088 A1 | 7/2004 | Patel et al. |
| 2004/0170765 A1 | 9/2004 | Ederer et al. |
| 2004/0187714 A1 | 9/2004 | Napadensky et al. |
| 2004/0207123 A1 | 10/2004 | Patel et al. |
| 2004/0239009 A1 | 12/2004 | Collins et al. |
| 2005/0003189 A1 | 1/2005 | Bredt et al. |
| 2005/0017386 A1 | 1/2005 | Harrysson |
| 2005/0017394 A1 | 1/2005 | Hochsmann et al. |
| 2005/0074511 A1 | 4/2005 | Oriakhi et al. |
| 2005/0079086 A1 | 4/2005 | Farr |
| 2005/0093194 A1 | 5/2005 | Oriakhi et al. |
| 2005/0167872 A1 | 8/2005 | Tsubaki et al. |
| 2005/0174407 A1 | 8/2005 | Johnson et al. |
| 2005/0179167 A1 | 8/2005 | Hachikian |
| 2005/0212163 A1 | 9/2005 | Bausinger et al. |
| 2005/0218549 A1 | 10/2005 | Farr et al. |
| 2005/0276976 A1 | 12/2005 | Pfeifer et al. |
| 2005/0280185 A1 | 12/2005 | Russell et al. |
| 2006/0012058 A1 | 1/2006 | Hasei |

(56) References Cited

U.S. PATENT DOCUMENTS

| | | |
|---|---|---|
| 2006/0103054 A1 | 5/2006 | Pfeifer et al. |
| 2006/0105102 A1 | 5/2006 | Hochsmann et al. |
| 2006/0159896 A1 | 7/2006 | Pfeifer et al. |
| 2006/0175346 A1 | 8/2006 | Ederer et al. |
| 2006/0208388 A1 | 9/2006 | Bredt et al. |
| 2006/0237159 A1 | 10/2006 | Hochsmann |
| 2006/0251535 A1 | 11/2006 | Pfeifer et al. |
| 2006/0254467 A1 | 11/2006 | Farr et al. |
| 2006/0257579 A1 | 11/2006 | Farr et al. |
| 2007/0045891 A1 | 3/2007 | Martinoni |
| 2007/0057412 A1 | 3/2007 | Weiskopf et al. |
| 2007/0126157 A1 | 6/2007 | Bredt |
| 2007/0238056 A1 | 10/2007 | Baumann et al. |
| 2007/0241482 A1 | 10/2007 | Giller et al. |
| 2008/0001331 A1 | 1/2008 | Ederer |
| 2008/0003390 A1 | 1/2008 | Hayashi |
| 2008/0018018 A1 | 1/2008 | Nielsen et al. |
| 2008/0047628 A1 | 2/2008 | Davidson et al. |
| 2008/0138515 A1 | 6/2008 | Williams |
| 2008/0187711 A1 | 8/2008 | Alam et al. |
| 2008/0233302 A1 | 9/2008 | Elsner et al. |
| 2008/0241404 A1 | 10/2008 | Allaman et al. |
| 2008/0260945 A1* | 10/2008 | Ederer ............... B22F 3/004 118/57 |
| 2008/0299321 A1 | 12/2008 | Ishihara |
| 2009/0068376 A1 | 3/2009 | Philippi et al. |
| 2010/0007048 A1 | 1/2010 | Schweininger |
| 2010/0007062 A1 | 1/2010 | Larsson et al. |
| 2010/0207288 A1 | 8/2010 | Dini |
| 2010/0212584 A1 | 8/2010 | Ederer et al. |
| 2010/0244301 A1 | 9/2010 | Ederer et al. |
| 2010/0247742 A1 | 9/2010 | Shi et al. |
| 2010/0272519 A1* | 10/2010 | Ederer ............... B29C 64/357 406/154 |
| 2010/0279007 A1 | 11/2010 | Briselden et al. |
| 2010/0291314 A1 | 11/2010 | Kahani-Shirazi |
| 2010/0323301 A1 | 12/2010 | Tang et al. |
| 2011/0049739 A1 | 3/2011 | Uckelmann et al. |
| 2011/0059247 A1 | 3/2011 | Kuzusako et al. |
| 2011/0177188 A1 | 7/2011 | Bredt et al. |
| 2011/0223349 A1* | 9/2011 | Scott ............... B29C 64/343 118/712 |
| 2011/0223437 A1 | 9/2011 | Ederer et al. |
| 2012/0046779 A1 | 2/2012 | Pax et al. |
| 2012/0097258 A1 | 4/2012 | Harmann et al. |
| 2012/0113439 A1 | 5/2012 | Ederer et al. |
| 2012/0126457 A1 | 5/2012 | Abe et al. |
| 2012/0291701 A1 | 11/2012 | Grasegger et al. |
| 2013/0000549 A1 | 1/2013 | Hartmann et al. |
| 2013/0004610 A1 | 1/2013 | Hartmann et al. |
| 2013/0026680 A1 | 1/2013 | Ederer et al. |
| 2013/0029001 A1 | 1/2013 | Gunther et al. |
| 2013/0199444 A1 | 8/2013 | Hartmann |
| 2013/0234355 A1 | 9/2013 | Hartmann et al. |
| 2013/0302575 A1 | 11/2013 | Mogele et al. |
| 2014/0048980 A1 | 2/2014 | Crump et al. |
| 2014/0065194 A1 | 3/2014 | Yoo |
| 2014/0212677 A1 | 7/2014 | Gnuchtel et al. |
| 2014/0227123 A1 | 8/2014 | Gunster |
| 2014/0271961 A1 | 9/2014 | Khoshnevis |
| 2014/0306379 A1 | 10/2014 | Hartmann et al. |
| 2015/0042018 A1 | 2/2015 | Gunther et al. |
| 2015/0110910 A1 | 4/2015 | Hartmann et al. |
| 2015/0224718 A1 | 8/2015 | Ederer et al. |
| 2015/0266238 A1 | 9/2015 | Ederer et al. |
| 2015/0273572 A1 | 10/2015 | Ederer et al. |
| 2015/0290881 A1 | 10/2015 | Ederer et al. |
| 2015/0375419 A1 | 12/2015 | Gunther et al. |
| 2016/0263828 A1 | 9/2016 | Ederer et al. |
| 2016/0303762 A1 | 10/2016 | Gunther |
| 2016/0311167 A1 | 10/2016 | Gunther et al. |
| 2016/0311210 A1 | 10/2016 | Gunther et al. |
| 2016/0318251 A1 | 11/2016 | Ederer et al. |
| 2017/0050378 A1 | 2/2017 | Ederer |
| 2017/0106595 A1 | 4/2017 | Gunther et al. |
| 2017/0151727 A1 | 6/2017 | Ederer et al. |
| 2017/0157852 A1 | 6/2017 | Ederer et al. |
| 2017/0182711 A1 | 6/2017 | Gunther et al. |
| 2017/0210037 A1 | 7/2017 | Ederer et al. |
| 2017/0297263 A1 | 10/2017 | Ederer et al. |
| 2017/0305139 A1 | 10/2017 | Hartmann |
| 2017/0355137 A1 | 12/2017 | Ederer et al. |
| 2018/0079133 A1 | 3/2018 | Ederer et al. |
| 2018/0111319 A1* | 4/2018 | Brezoczky ............. B29C 64/255 |
| 2018/0141271 A1 | 5/2018 | Gunter et al. |
| 2018/0200792 A1 | 7/2018 | Redding et al. |
| 2018/0326662 A1 | 11/2018 | Gunther et al. |
| 2018/0339452 A1* | 11/2018 | Heymel ............. B29C 64/241 |
| 2018/0369910 A1 | 12/2018 | Gunter et al. |
| 2019/0047218 A1 | 2/2019 | Ederer et al. |
| 2019/0084229 A1 | 3/2019 | Gunther |
| 2019/0091921 A1* | 3/2019 | Paternoster ............. B22F 12/57 |
| 2020/0055246 A1 | 2/2020 | Gunther et al. |
| 2020/0130263 A1 | 4/2020 | Gunther et al. |
| 2020/0189259 A1 | 6/2020 | Hartmann et al. |
| 2020/0262141 A1 | 8/2020 | Ederer et al. |

FOREIGN PATENT DOCUMENTS

| | | |
|---|---|---|
| CN | 106885001 A | 6/2017 |
| DE | 42338 C | 3/1888 |
| DE | 3221357 A1 | 12/1983 |
| DE | 3930750 C2 | 3/1991 |
| DE | 4102260 A1 | 7/1992 |
| DE | 4305201 C1 | 4/1994 |
| DE | 4 325 573 A1 | 2/1995 |
| DE | 29506204 U1 | 6/1995 |
| DE | 4440397 | 9/1995 |
| DE | 19530295 C1 | 1/1997 |
| DE | 19528215 A1 | 2/1997 |
| DE | 29701279 U1 | 5/1997 |
| DE | 19545167 A1 | 6/1997 |
| DE | 69031808 T2 | 4/1998 |
| DE | 19853834 | 5/2000 |
| DE | 69634921 T2 | 12/2005 |
| DE | 201 22 639 U1 | 11/2006 |
| DE | 102006040305 A1 | 3/2007 |
| DE | 102006029298 A1 | 12/2007 |
| DE | 102007015015 A1 | 10/2008 |
| DE | 102007040755 A1 | 3/2009 |
| DE | 102007047326 A1 | 4/2009 |
| DE | 102011053205 A1 | 3/2013 |
| DE | 102015222100 A1 * | 5/2017 ............. B22F 3/1055 |
| DE | 102016014349 A1 | 6/2018 |
| EP | 0361847 B1 | 4/1990 |
| EP | 1415792 | 5/2004 |
| EP | 1457590 A | 9/2004 |
| EP | 2202016 A1 | 6/2010 |
| GB | 2297516 A | 8/1996 |
| JP | S62275734 A | 11/1987 |
| JP | 2003/136605 A | 5/2003 |
| JP | 2004/082206 A | 3/2004 |
| JP | 2009/202451 A | 9/2009 |
| WO | 90/03893 A1 | 4/1990 |
| WO | 01/40866 A2 | 6/2001 |
| WO | 2004/014637 A1 | 2/2004 |
| WO | 2006/100166 A1 | 9/2006 |
| WO | 2008/049384 A1 | 5/2008 |
| WO | 2008/061520 A2 | 5/2008 |
| WO | 2011/063786 A1 | 6/2011 |
| WO | 2013/075696 A1 | 5/2013 |
| WO | 2014/036643 A1 | 3/2014 |
| WO | 2014/090207 A1 | 6/2014 |
| WO | 2014/166469 A1 | 10/2014 |
| WO | 2016/019942 A1 | 2/2016 |
| WO | 2017/008777 A1 | 1/2017 |

OTHER PUBLICATIONS

Armin Scharf, "Erster 3D-Endlosdrucker", zwomp.de, http://www.zwomp.de/2012/11/06/voxeljet-endlosdrucker/ dated Nov. 6, 2012.

Cima et al., "Computer-derived Microstructures by 3D Printing: Bio- and Structural Materials," SFF Symposium, Austin, TX, 1994.

(56) References Cited

OTHER PUBLICATIONS

EOS Operating Manual for Laser Sintering Machine with Brief Summary Feb. 22, 2005.
Feature Article—Rapid Tooling—Cast Resin and Sprayed Metal Tooling by Joel Segal, Apr. 2000.
Gebhart, Rapid Prototyping, pp. 118-119, 1996.
Jacobs et al., 2005 SME Technical Paper, title "Are QuickCast Patterns Suitable for Limited Production?".
Marcus et al., Solid Freedom Fabrication Proceedings, Nov. 1993.
Marcus, et al., Solid Freeform Fabrication Proceedings, Sep. 1995, pp. 130-133.
Sachs et al., "Three-Dimensional Printing: Rapid Tooling and Prototypes Directly from a CAD Model", Massachusetts Institute of Technology, pp. 143-151, Jan. 1990.
Sachs, E., P. Williams, D. Brancazio, M. Cima, and K. Kremmin, Three dimensional printing: Rapid Tooling and Prototypes Directly from a CAD Model. In Proceedings of Manufacturing International 1990 (Atlanta, GA, Mar. 25-28). ASME, New York, 1990, pp. 131-136.
Screen shots of URL: http://www.youtube.com/watch?v=hgIrNXZjIxU taken in approximately 5 second intervals on Nov. 12, 2015.
Williams, "Feasibility Study of Investment Casting Pattern Design by Means of Three Dimensional Printing", Department of Mechanical Engineering, abstract only; Sep. 25, 2001.
International Search Report & Written Opinion for PCT Application No. PCT/DE2019/000222 dated Feb. 20, 2020.

* cited by examiner

CLOSURE DEVICE, 3D PRINTING DEVICE AND METHOD FOR PRODUCING 3D-MOLDED PARTS

The invention relates to a method and a device for producing three-dimensional models by means of a layer construction technique.

European Patent EP 0 431 924 B1 describes a process for producing three-dimensional objects based on computer data. In the process, a thin layer of particulate material is deposited on a platform and has a binder material selectively printed thereon by means of a print head. The particulate region with the binder printed thereon bonds and solidifies under the influence of the binder and, optionally, an additional hardener. Next, the platform is lowered by one layer thickness into a construction cylinder and provided with a new layer of particulate material, the latter also being printed on as described above. These steps are repeated until a certain desired height of the object is achieved. Thus, the printed and solidified regions form a three-dimensional object.

Upon completion, the object made of solidified particulate material is embedded in loose particulate material, from which it is subsequently freed. For this purpose, a suction device may be used, for example. This leaves the desired objects which then have to be freed from any residual powder, e.g. by brushing it off.

Powder application is a crucial step, where correct metering and targeted and controlled application of the powder material are important. The coater speed or the speed at which the particulate material can be applied has a considerable influence on the production time of the components and thus also on the cost-effectiveness of the machine used.

For better metering of the powder material, coaters can, for example, have an adjustable opening, often in the form of a gap. This gap can, for example, extend over a large part of the width of the coater.

One problem with known coaters that use an adjustable gap or opening is that the gap size or opening must be increased in order to be able to dispense a larger amount of particulate material. This may affect the controllability of the particle discharge, because the gap or slot may no longer be controllable, since particulate material already flows out at standstill.

This problem occurs particularly with coaters that use a material cone to close the gap or slot and open it by vibration, thus controlling the particle material discharge.

Examples of this are so-called oscillating blade coaters as described in DE10117875A1 or DE10216013A1.

In order to still be able to form a material cone for sealing in a large opening of the coater, the coating blade would have to be formed in dimensions that would be problematic from a design point of view, as the usable coater dimensions would then make the construction field size uneconomic. In particular, a very long coating blade would have to be used to be able to build up a material cone that can cause closure of the gap. However, a coating blade of large dimensions would reduce the space suitable for construction and thus reduce cost-effectiveness.

Another problem is the starting speed or the delay in gap opening, by vibration, of oscillating blade coater openings closed by material cones and the associated quality problems due to insufficient particulate material application. The problem here is that the coater travels or starts at a certain speed. In the process, the coater travels a certain distance above the construction field, while the vibration in the oscillating blade coater causes the material cone seal to collapse, allowing particulate material to flow out. However, it can happen that the particulate material flow starts too late and thus not enough particulate material is applied to a certain part of the construction field. As a result, either too little volume of particulate material or no particulate material at all may be applied in certain areas of the construction field during this time frame.

It was therefore an object of the present invention to provide constructional means allowing an improved 3D printing method or at least improving or altogether avoiding the disadvantages of the prior art.

Another object of the present invention was to modify a coater in such a way that a large amount of particulate material can be applied from a coater to the construction platform and at the same time the gap opening of the coater can be completely closed and the coater can still be moved at high speed in order to be able to achieve advantageous and/or shortened production times.

Accordingly, another object of the present invention was to provide a method, a material system and/or a device helping to reduce or altogether avoiding or preventing the disadvantages of the prior art.

BRIEF SUMMARY OF THE INVENTION

In one aspect, the invention relates to a closure device suitable for a 3D printing device or/and coater device comprising a controllable closure means.

In another aspect, the invention relates to a 3D printing device comprising a controllable closure means.

In a further aspect, the invention relates to a method for producing 3D molded parts, wherein particulate construction material is applied in a defined layer onto a construction field by means of a coater and is selectively solidified in order to obtain a 3D molded part, wherein the coater includes a closure device which comprises a controllable closure means.

BRIEF DESCRIPTION OF THE DRAWINGS

FIG. 2 describes another aspect of the disclosure.

Figures 1A, 1B:
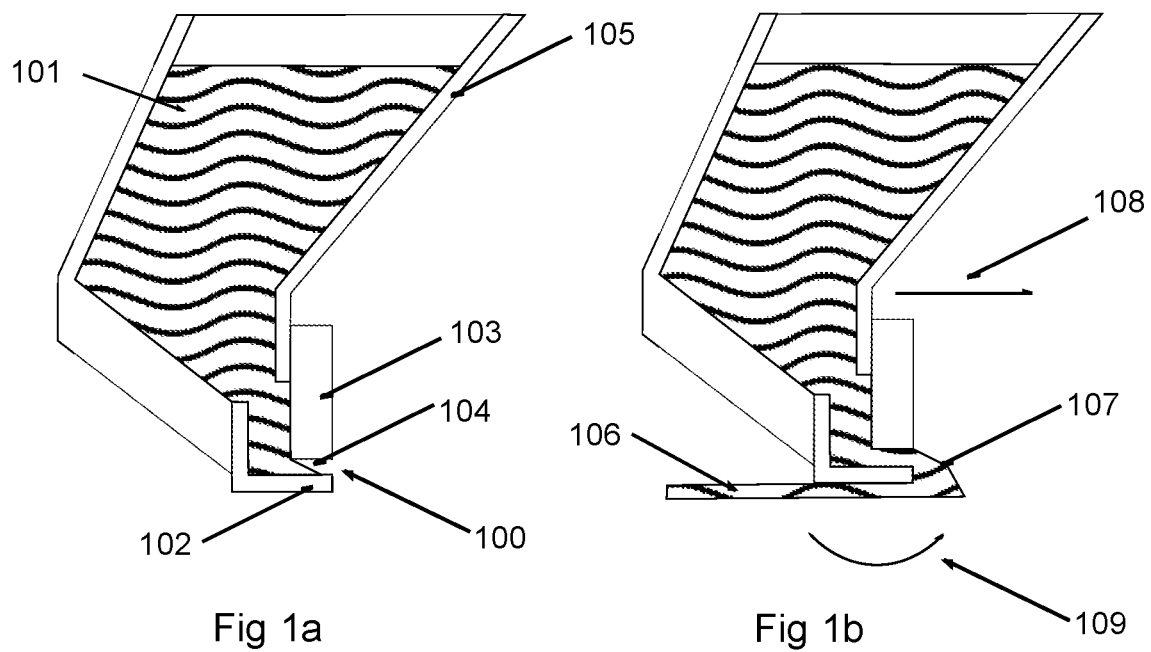
FIG. 1a shows an aspect of the disclosure, wherein a coater container 105 containing particulate material 101 is illustrated. The coating blade 102 faces the construction platform (not shown) and forms a coater gap 100 with the adjustable orifice plate 103 (closure means), in which coater gap 100 a material cone of particulate material 104 forms to close the gap. The adjustable orifice plate 103 can be controlled by suitable means to further open the coater gap 100. In this way, for example, an increased amount of particulate material can be applied to the construction platform (not shown) and thus the travel speed of the coater can be increased. If the coater gap is to be closed again, the orifice plate 103 is controlled to reduce the coater gap so that a material cone can form again as soon as the oscillation of the coating blade 102 stops.
FIG. 1b shows the process of applying the particulate material, wherein the coater is moved in a feed motion 108. The coating blade 102 (see FIG. 1a) is made to vibrate with an oscillating motion 109 so that the material cone seal opens and particulate material flows out, a roll of particulate material 107 is formed and a deposited layer of particulate material 106 is applied.
Figures 2A, 2B:
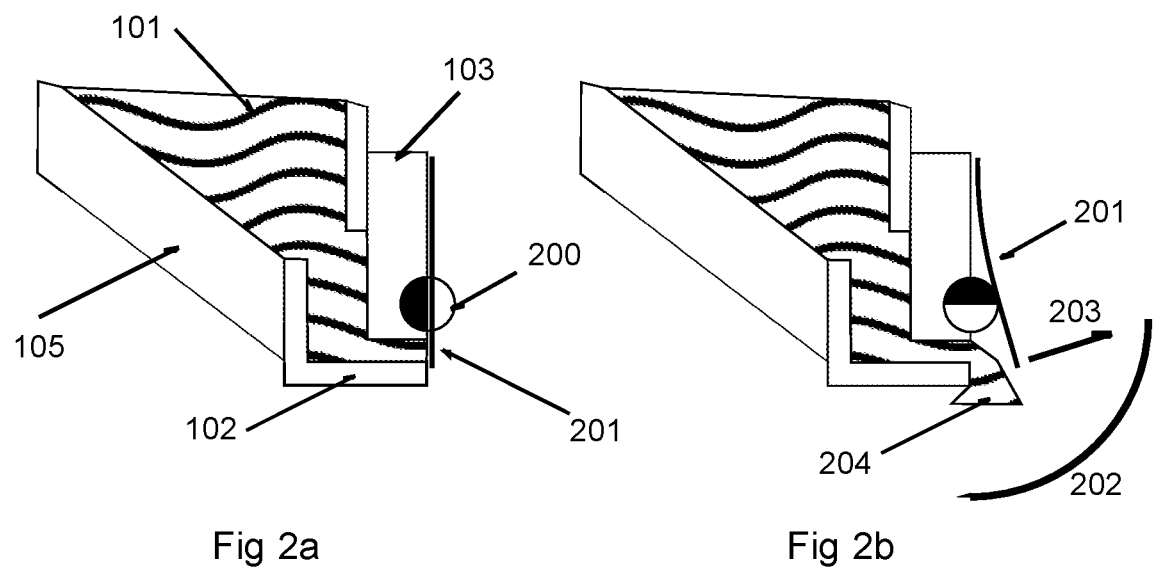
FIG. 2a shows a coater container 105 filled with particulate material 101 and the coating blade 102 and the adjustable orifice plate 103 with closing sheet 201 and control roller 200. In this position of the closing sheet 201, no particulate material can exit from the gap.
In FIG. 2b, the control roller 200 is actuated and a rotation causes the closing sheet 201 to move in the direction 203, opening the coater container so that the particulate material 204 flowing out forms a powder roll and a layer of particulate material is formed on the construction platform as the coater container passes over the construction platform.
Figures 3A, 3B:
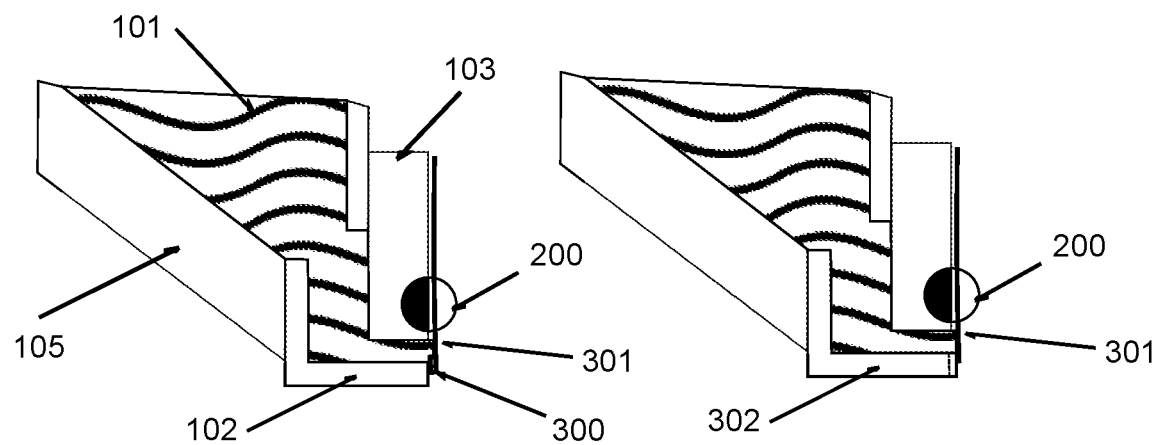
FIGS. 3a and 3b describe another aspect of the disclosure.

A coater container 105 containing particulate material 101 is shown, as well as the closure device, which includes an extended blade 302, an adjustable orifice plate 103, a biased closing sheet 301, a closure seal 300, and a control roller 200.

FIG. 4 describes another aspect of the disclosure, wherein the actuation, i.e. the opening and closing of the opening by means of the closing sheet 201, is performed by actuating a slotted link.

Figure 4A:
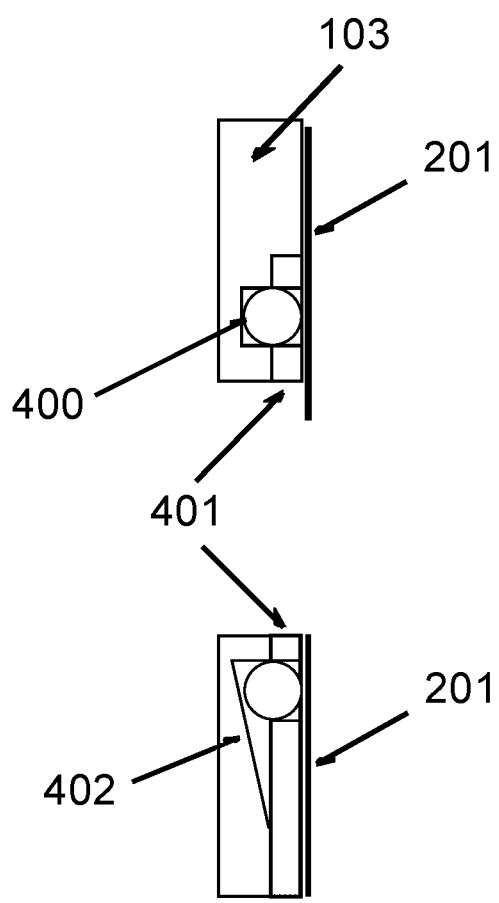
Figure 4B:
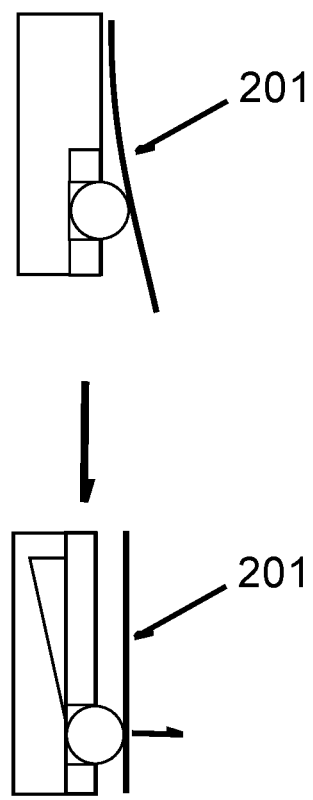

In FIG. 4a the gap is closed and in FIG. 4b the closing sheet 201 is folded or displaced in parallel, thus opening the gap of the coater container. Thereby, a ball 400 is moved in the slotted link.

Figure 5A:
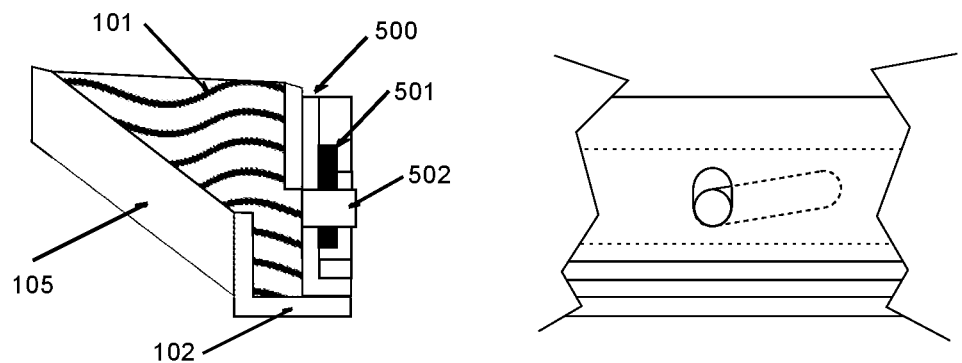
Figure 5B:
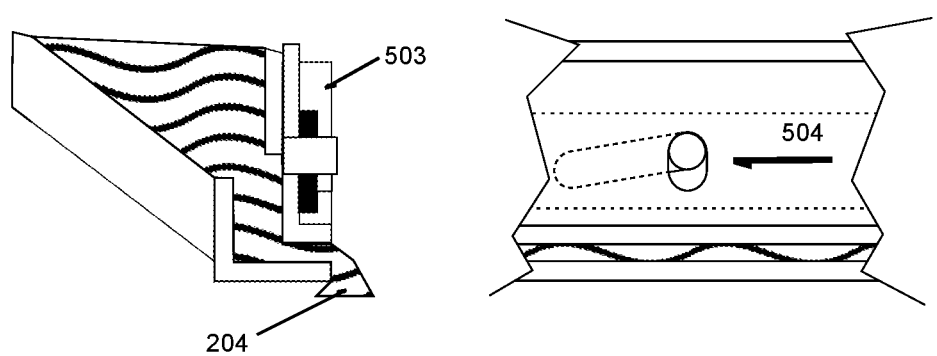

FIG. 5 describes another aspect of the disclosure, with FIG. 5a showing a closed gap and FIG. 5b showing an open gap of the coater container. Here, a vertically movable orifice plate 500 and a horizontally movable slotted link 501 are used. 502 denotes the cylinder connected to the orifice plate, 503 denotes the slotted link guide and 504 denotes the slotted link movement, respectively.

Figure 6:
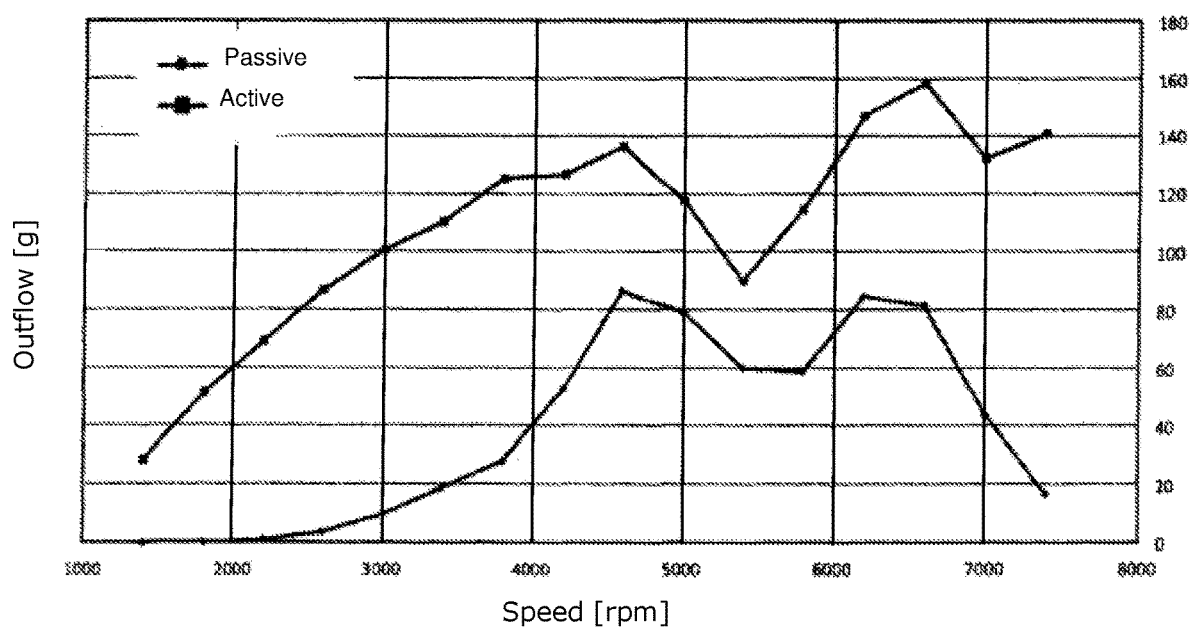

FIG. 6 describes another aspect of the disclosure, showing a simplified outflow diagram for a dual coater system with the outflows of the activated (active—according to the invention) and the non-activated (passive—prior art) coater. It becomes clear that the closure system according to the invention allows a larger volume to be applied to the construction platform.

Figure 7:
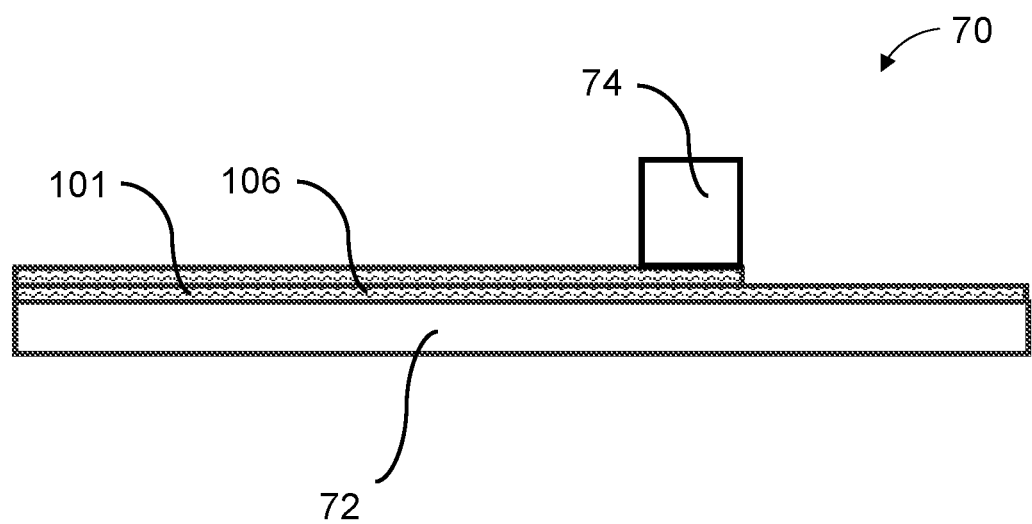

FIG. 7 shows illustrative features of a 3D printing device (70) including a coater device (74).

DETAILED DESCRIPTION OF THE INVENTION

According to the invention, an object underling the application is achieved by providing a closure device which can be closed completely and, once started, can discharge increased amounts of particulate material for application to the construction platform.

First of all, several terms according to the invention will be explained in more detail below.

A "3D molded part", "molded article" or "part" in the sense of the invention means any three-dimensional object manufactured by means of the method according to the invention or/and the device according to the invention and exhibiting dimensional stability.

"Construction space" is the geometric location where the particulate material bed grows during the construction process by repeated coating with particulate material or through which the bed passes when applying continuous principles. The construction space is generally bounded by a bottom, i.e. the construction platform, by walls and an open top surface, i.e. the construction plane. In continuous principles, there usually is a conveyor belt and limiting side walls. The construction space can also be designed in the form of what is called a job box, which constitutes a unit that can be moved in and out of the device and allows batch production, with one job box being moved out after completion of a process to allow a new job box to be moved into the device immediately, thereby increasing both the production volume and, consequently, the performance of the device.

"Construction platform" or "construction field" as used in the disclosure means the surface to which the particulate material is applied and on which the particulate material is selectively solidified to build up a predetermined three-dimensional molded part.

The "particulate materials" or "particulate construction materials" or "construction materials" of use herein may be any materials known for powder-based 3D printing, in particular polymers, ceramics and metals. The particulate material is preferably a free-flowing powder when dry, but may also be a cohesive, cut-resistant powder or a particle-charged liquid. In this specification, particulate material and powder are used synonymously.

The "particulate material application" is the process of generating a defined layer (106) of powder (101). This may be done either on the construction platform (72) or on an inclined plane relative to a conveyor belt in continuous principles. The particulate material application will also be referred to below as "coating" or "recoating".

"Selective liquid application" in the sense of the invention may be effected after each particulate material application or irregularly, depending on the requirements for the molded article and for optimization of the molded article production, e.g. several times with respect to particulate material application. In this case, a sectional image of the desired article is printed.

The "device" used for carrying out the method according to the invention may be any known 3D-printing device (70) which includes the required parts. Common components include coater (74), construction field, means for moving the construction field or other components in continuous processes, metering devices and heating and/or irradiating means and other components which are known to the person skilled in the art and will therefore not be described in detail herein.

A "closure device" or "closure unit" in the sense of the disclosure combines the positive features that can be achieved by an oscillating blade design and at the same time allows a faster start-up of the coater device as well as the application of larger volumes of particulate material. Such a "closure device" comprises or includes at least one oscillating blade and a closure means which can be controlled by suitable means, e.g. by an eccentric, a draw key or/and a slotted link.

The "packing density" describes the filling of the geometric space by a solid. It depends on the nature of the particulate material and the application device and is an important initial parameter for the sintering process.

The construction material is always applied in a "defined layer" or "layer thickness", which is individually adjusted according to the construction material and the process conditions. It is, for example, 0.05 to 0.5 mm, preferably 0.1 to 0.3 mm.

"Gap" or "gap opening" as used in the disclosure refers to the means through which particulate material is applied by the recoater or to the construction platform, respectively, and by means of which the applied amount of particulate material can be controlled. The particulate material exits the coater through the "gap" or "gap opening" and flows onto the construction platform. The "closure" or "coater closure" controls the amount of particulate material released.

A "coating blade" or "oscillating blade" in the sense of the disclosure relates to a means of a coater device facing the construction platform, which may be combined with further means to control the application of particulate material. The "coating blade" can form a gap with another part or means of the coater device, which gap is closed by a material cone at standstill. In the present disclosure, the "coating blade" is closed and opened by a controllable closure, e.g. a spring steel sheet, thereby controlling the application of particulate material to the construction field.

A "closure device" in the sense of the disclosure relates to the combination of coating blade, controllable closure and actuator in a particulate material coater.

A "closure means" or "closure" or "coater closure" in the sense of the disclosure is a means that allows the gap of the coater to be closed and opened in a controlled manner. This may be a spring steel sheet, for example.

An "actuating means" or "actuator" in the sense of the disclosure is used to open and close the closure means.

"Opening speed" in the sense of the disclosure means the length of time it takes for the closure means to be driven from its closed position to its maximum opening.

In the sense of the disclosure, "closure opening process" refers to the process of moving the closure means from its closed position to its open position. Accordingly, a "closure closing process" is the reverse process.

"Travel speed" in the sense of the disclosure refers to the speed of advancing or retracting the coater. The travel speed and the opening speed are important variables that influence the process sequence, the production speed for 3D molded parts and the control of the start-up and the printing process. Thus, these variables also influence the cost-effectiveness of a 3D printing device.

The aspects of the invention will be described below.

In one aspect, the invention relates to a closure device suitable for a 3D printing device or/and coater device (74), comprising a closure means, preferably a steel sheet, e.g. a spring steel sheet, wherein the closure means is controllable and can be opened by a control means, wherein the control means is an eccentric, a draw key and/or a slotted link.

The method according to the invention provides a particularly advantageous solution to solve the problem underlying the application.

With the inventive closure system and coater, it is possible to increase the powder throughput or the particulate material application of the coater, and thus to achieve higher travel speeds as well as increase the application speed and the application volume per time unit.

Surprisingly, using the above device components in the combination shown, very advantageous process results were achieved.

With the device according to the invention, the above-described problems or disadvantages are at least reduced or avoided completely.

The closure device described herein can be incorporated into 3D printing devices and/or coater devices that use and apply fluid particulate material for layer construction and for building up the 3D molded parts. The coater may be a single powder coater or a dual coater.

The closure device may include a control means which is used to open the closure means, e.g. a steel spring sheet, and/or to control the gap width (gap size). A closure device thus comprises at least a closure means, a coating blade, and a particulate material supply or container, the parts being connected to each other such that an application onto a construction field can be performed in a controlled manner. The control means can open the closure means 1 to 5 mm.

With the closure device, it is also possible to control the opening speed and accordingly apply particulate material selectively onto the construction platform. The required speed is designed to achieve a maximum opening of the closure device. In this case, the opening speed (maximum opening of the gap) can be from 0.5/10 to 3/10 seconds; it is preferably from 1/10 to 2/10 seconds.

With the coater and/or closure as described herein, it becomes advantageously possible to better control not only the application amount, but also the start-up speed for dispensing particulate material. Furthermore, the problem of no particulate material application when starting up the coater can be avoided, resulting in quality advantages in the components. This also increases cost-effectiveness, as waste is reduced.

Furthermore, known coaters will always produce a large amount of waste particulate material that cannot be recycled or can only be recycled with increased effort and the associated costs. With the coater or closure as described herein, these disadvantages of the prior art can be avoided or at least reduced.

Also, a closure as described herein facilitates the stepwise arrangement of coaters as described in detail below.

In conventional oscillating coaters, the outflow can only be adjusted by mechanically adjusting the gap outside the process, whereas the device according to the invention allows the gap to be adjusted and even controlled during operation.

The closure device can be installed in a coater which has a coater opening in the direction of travel. This may be essentially an oscillating blade recoater as described in the prior art specified above. It may also be a dual coater, which has an oscillating blade opening in each direction of travel and can thus be used to apply particulate material to the construction field in both directions of travel.

In another aspect, the disclosure relates to a 3D printing device or/and a coater device comprising a closure means as described above, wherein the distance travelled by the coater device during start-up or when passing over the construction field, from the start of the closure opening process to the opening of the closure, is 2 cm to 10 cm, preferably 3 cm to 7 cm, at a travel speed of the coater device or the closure device of 350 mm/second.

The 3D printing device or/and coater device described herein may comprise: a closure device as described above and a coating blade as described above.

The coating blade can be made of any suitable material and is preferably made of a stainless steel sheet.

The coating blade can be made to oscillate by any means known to the person skilled in the art. The oscillation is generated, for example, by means of one or more eccentrics.

In the 3D printing device or/and coater device described herein, the powder material (particulate material) can be discharged using a combination of the closure device described herein and vibration of the coating blade. This advantageously realizes the advantages of an oscillating blade coater and avoids the disadvantages of particulate material volumes that can be applied only to a limited extent.

The coater closure can be achieved by covering the gap, as well as by changing the material cone in the gap by changing the aspect ratio (i.e., the ratio of gap height to gap length) of the gap by suitable measures, preferably reducing the gap height by moving the orifice plate.

In another embodiment, the disclosure relates to a method for producing 3D molded parts using a closure device or 3D printing device or coater device as described above.

Known print heads with suitable technology are used to apply the printing liquid. The liquid may be selectively applied by means of one or more print heads. Preferably, the print head or print heads are adjustable in terms of drop mass. The print head or print heads may selectively apply the liquid in one or both directions of travel. The method allows the particulate construction material to be selectively solidified, preferably selectively solidified and sintered.

In the construction process, the construction material and the printing liquid are cyclically applied. For this purpose, the construction field is lowered by the selected layer thickness or the application units are raised correspondingly. These operations are cyclically repeated.

A closure as described herein is particularly advantageous in combination with the method or/and the device arrangement described below, and it is characterized by various advantages:

The closure described above is combined with a method for producing three-dimensional models by means of a layer construction technique, wherein particulate construction material is applied in a defined layer onto a construction field and a liquid binding agent is selectively applied onto the construction material, a movement by a certain amount is performed and these steps are repeated, until the desired object is obtained, wherein the steps of applying the particulate material and applying the binding agent are performed substantially at the same time.

The method as described above is characterized in that the particulate construction material is applied by a coater or/and the liquid binding agent is applied by a print head.

In this regard, the method described above can be characterized in that the print head as a device means follows the coater as a device means at a defined distance, preferably at a distance of 1000 mm-300 mm, more preferably 300 mm-50 mm, even more preferably directly.

Furthermore, in the method described above, the device means can be moved at a speed of m/s to 1 m/s, the various device means preferably being movable at the same or different speeds.

In one embodiment, the method described above is characterized in that the device means are returned and the return pass of the device means is performed rapidly, preferably at a speed of 0.5 m/s to 5 m/s.

Another method as described above is characterized in that the application of the construction material and the application of the binding agent take place in the forward as well as in the return pass.

Particularly advantageously, the closure as described above allows the material application to be precisely controlled, which has a positive effect on the process sequence as well as on the quality of the parts produced in this way.

Another method as described above is characterized in that several device means of the coater and of the metering unit, preferably 2 to 20 each, more preferably 4 to 15, form several layers in one pass.

In this regard, the method as described above may be characterized in that a plurality of device means form a plurality of layers in one pass both in the forward and in the return pass, the method preferably being characterized in that a plurality of device means build up a plurality of layers on a continuously operating conveyor unit.

The method as described above may also be characterized in that an inclined printing process, a batch process or/and a continuous process is used as the basic process.

Furthermore, the closure as described above can be advantageously combined in a device for producing three-dimensional models by means of layer construction technique, said device comprising at least two, preferably 3-20, printing means, at least two, preferably 2-20, coating means downstream, said device preferably comprising at least two coating means and at least two printing means and preferably being characterized in that the printing means and the coating means are arranged on the same axis, preferably being characterized in that the pressure means is designed as a line head, preferably being characterized in that the pressure means and the coater means can be moved at a speed of 0.02 m/s to 5 m/s, preferably being characterized in that the printing means and the coating means are arranged and designed in such a way that they can operate in forward as well as in reverse, preferably being characterized in that the printing means and the coating means are adjustable in different planes, preferably in their height, preferably in the Z-axis, preferably being characterized in that the printing means and the coating means are arranged in a staggered manner, preferably in that they are arranged in such a way that they can apply and deposit several layers on top of each other, preferably being characterized in that it comprises a continuously operating conveyor unit, preferably being characterized in that it is designed as an inclined printer, a batch printer or a continuously operating printer, preferably being characterized in that it is designed as an inclined printer or/and the device means are arranged in a vertical carousel or in a wheel-like manner.

In one embodiment, the inventors were able to use a combination of a method or a device with the closure described above to not only significantly increase a volume output at a satisfactory quality level, but also to make it even better controllable.

The parallelization of the coating and printing processes described herein can be controlled even more precisely by means of the closure described above. The various printing operations are carried out substantially simultaneously and can advantageously be controlled very precisely by using the closure described above, making it possible to arrange several coaters and printing units in series and to deposit and selectively solidify several layers in one pass. This does not require increases in travel speeds or other measures that negatively affect the quality of the products produced.

LIST OF REFERENCE NUMERALS 100 coater gap
101 particulate material
102 coating blade
103 adjustable orifice plate
104 material cone of particulate material
105 coater container
106 deposited layer of particulate material
107 particulate material roll (limited by material cone)
108 feed motion
109 oscillating motion of blade
200 control roller
201 closing sheet
202 control roller rotation
203 movement of closing sheet
204 particulate material flowing out
300 closure seal
301 biased closing sheet
302 extended blade
400 ball
401 actuating slider
402 slotted link in the orifice plate
500 vertically movable orifice plate
501 horizontally movable slotted link
502 cylinder connected to the orifice plate
503 slotted link guide
504 slotted link movement

What is claimed is:

1. A closure device comprising:
a closure means, wherein the closure means is controllable and can be opened by a control means, wherein the control means includes an eccentric and/or a slotted link, wherein the closure device is in a coater device of a 3D printing device;
wherein the closure means closes the coater device to prevent outflow of a particulate material and opens the coater device to allow outflow of the particulate material;
wherein the closure device comprises a vertically adjustable orifice plate, wherein the orifice plate controls the size of a discharge gap of the coater device.

2. The closure device according to claim 1, wherein the coater device is a powder coater.

3. The closure device according to claim 2, wherein the closure means can be opened 1 to 5 mm, at its maximum opening width, by the control means.

4. The closure device according to claim 3, wherein an actuator opens the closure device at an opening speed from 0.05 to 0.3 seconds, wherein the opening speed is the length of time for the closure means to be driven from a closed position to a maximum opening position.

5. The closure device of claim 4, wherein the closure means includes a spring steel sheet.

6. The closure device of claim 5, wherein the opening speed is 0.1 to 0.2 seconds.

7. The closure device of claim 4, wherein the control means includes the eccentric.

8. The closure device of claim 4, wherein the control means includes the slotted link.

9. The closure device of claim 2, wherein the control means includes a horizontally movable slotted link.

10. The closure device of claim 1, wherein the discharge opening includes a gap and the closure means covers the gap.

11. The closure device of claim 1, wherein the discharge opening includes a gap and the closure means closes the gap.

12. The closure device of claim 1, wherein the particulate material flows in a generally horizontal direction through the discharge opening.

13. A closure device
wherein the closure device is in a coater device having a single discharge opening characterized by a discharge gap, and the coater is in a 3D printing device;
the closure device comprising
a closure means, wherein the closure means is controllable and can be opened by a control means, wherein the control means includes an eccentric and/or a slotted link, wherein the closure means closes the discharge opening of the coater device to prevent outflow of a particulate material and opens the discharge opening of the coater device to allow outflow of the particulate material;
wherein the discharge opening is at an end of the coater device, directly before a construction space;
wherein the closure device comprises a vertically adjustable orifice plate, wherein the orifice plate controls the size of the discharge gap.

* * * * *